(12) United States Patent
Blakey (10) Patent No.: US 7,316,067 B2
(45) Date of Patent: Jan. 8, 2008

(54) FORMING A PERFORATE MEMBRANE BY LASER DRILLING AND A SUBSEQUENT ELECTRO-POLISHING STEP

(75) Inventor: David Mark Blakey, Herts (GB)

(73) Assignee: The Technology Partnership, Melbourn Royston, Hertz (GB)

( * ) Notice: Subject to any disclaimer, the term of this patent is extended or adjusted under 35 U.S.C. 154(b) by 0 days.

(21) Appl. No.: 10/489,327

(22) PCT Filed: Sep. 6, 2002

(86) PCT No.: PCT/GB02/04093

§ 371 (c)(1),
(2), (4) Date: Jul. 30, 2004

(87) PCT Pub. No.: WO03/026832

PCT Pub. Date: Apr. 3, 2003

(65) Prior Publication Data

US 2005/0006359 A1    Jan. 13, 2005

(30) Foreign Application Priority Data

Sep. 24, 2001   (EP) .................................. 01308106

(51) Int. Cl.
*B23P 15/16* (2006.01)
*B05B 1/00* (2006.01)
*B23K 26/00* (2006.01)
*B23H 3/00* (2006.01)

(52) U.S. Cl. ................. 29/896.6; 29/890.142; 29/890.143; 239/596; 239/601; 219/121.71; 205/640; 205/641

(58) Field of Classification Search ........... 29/890.142, 29/890.143, 896.6; 239/102.1, 102.2, 596, 239/599, 601, 589, 589.1; 219/121.7, 121.71; 205/640–686
See application file for complete search history.

(56) References Cited

U.S. PATENT DOCUMENTS 4,327,594 A * 5/1982 Nelson ..................... 73/863.22
5,237,148 A * 8/1993 Aoki et al. ............... 219/121.7
5,294,309 A * 3/1994 Seimiya et al. ............. 205/660

(Continued)

FOREIGN PATENT DOCUMENTS

DE          195 03 983          8/1996

(Continued)

*Primary Examiner*—David P. Bryant
*Assistant Examiner*—Sarang Afzali (57) ABSTRACT

A method of forming a perforate membrane (1) is disclosed for use in a liquid transport device. The membrane has at least plural nozzles (10) formed therethrough. Each of those nozzles has a throat portion (12) opening at opposite end through opposite surface (2') of the perforate membrane and a smoothly curved outwardly diverging portion (11) extending from the first end of the throat portion to the first surface (2) of the perforate membrane. Laser energy is applied selectively to the first surface (2) of the membrane in the form of a pulsed, focused beam to form the nozzles (10) and thereafter the first surface (2) of the membrane and the surface of the diverging portion (11) of the nozzles (10) are electro-polished to remove surface imperfections. The electro-polishing is controlled so as to remove material from the surface of the diverging portion (11) of the nozzles to a depth less than the length of the throat portion (12).

18 Claims, 6 Drawing Sheets

U.S. PATENT DOCUMENTS 6,203,291 B1 * 3/2001 Stemme et al. .......... 417/413.3
6,320,158 B1 * 11/2001 Kitajima et al. ......... 219/121.7
6,826,833 B1 * 12/2004 Maier et al. ............. 29/888.44

FOREIGN PATENT DOCUMENTS

DE         19503983 A1 *  8/1996
WO    WO 0111229     *  2/2001

* cited by examiner

FORMING A PERFORATE MEMBRANE BY LASER DRILLING AND A SUBSEQUENT ELECTRO-POLISHING STEP

BACKGROUND OF INVENTION

1. Field of the Invention

The present invention relates to nozzles, and more particularly, nozzles In perforate membranes for use in fluid transfer devices. Such devices include aerosol generators, fluid pumps, and filter membranes. In such devices, fluid is transferred through the nozzles in the membrane. However in each case, the membrane provides certain properties that can be related to the geometry of the nozzles contained therein.

2. Description of Related Art

Perforate membranes are known in aerosol creating devices, where bulk liquid is transferred from the source side of the membrane, through the nozzles, and disrupted so as to create droplets at the opposite (emergent) side of the membrane. Various devices are disclosed in WO-A-95/15822, U.S. Pat. No. 5,518,179, U.S. Pat. No. 5,152,456 and U.S. Pat. No. 4,533,082, for creating aerosol droplets using a vibrating perforate membrane. These devices use some differing methods for transferring the liquid through the nozzles, and to create droplets at opposite side of the membrane.

In U.S. Pat. No. 5,152,456, bulk liquid is brought at ambient or near ambient hydrostatic pressure to a surface of the membrane (liquid-side), at which the cross-sectional area of the nozzles intersecting this surface is larger than the cross-sectional area of the same nozzles intersecting the opposite surface (air-side). For a stationary membrane, a liquid that wets the membrane material, and ambient pressure conditions, the fluid meniscus within the nozzle travels through the nozzle by capillary action to stabilise its position at the air-side of the nozzle (where the surface area of the meniscus is at a minimum). Thus the nozzle becomes liquid-filled. During operation, a periodic bending-mode vibration is generated in the perforate membrane, which harmonically displaces the membrane towards and away from the bulk liquid, resulting in a varying hydraulic pressure in the liquid near to the liquid-side of the membrane. Such pressure causes liquid to transfer through the nozzles in a periodic manner. The transfer is from the liquid side to the air-side as the pressure increases above the ambient hydrostatic pressure. When the momentum with which the liquid is transferred through a nozzle and towards the air side of the perforate membrane is sufficiently large, part of the liquid so transferred detaches from the bulk liquid and, under the influence of its surface tension, it then forms a droplet, which travels away from the air-side of the membrane. This can occur simultaneously for many or all nozzles within the membrane.

The droplet diameter ejected from such devices is typically between 1 and 2 times the average diameter of the smallest cross-sectional area of the nozzle. We have found that this droplet diameter depends also on the degree of surface roughness in or near to the nozzle at its intersection with the air-side of the membrane. Such roughness may be in the form of micro-capillary structures on the surface, which easily wet with liquid, causing some liquid volume to reside on the air-side of the membrane throughout the hydraulic pressure cycle. In this case, the liquid meniscus of the ejecting liquid in the positive segment of the pressure cycle is relatively poorly pinned to the circumference of the nozzle, and connects with the meniscus of the volume of liquid external to the nozzle. We have found that such a loss of control over the geometry of the liquid meniscus during the droplet creation process can lead to an enlargement of the droplets ejected from such nozzles and to poor control over ejection direction, due to collection of additional liquid volume from the air-side surface of the membrane. U.S. Pat. No. 5,152,456 further comprise nozzle geometries without a marked and sudden change in both cross-sectional area or in the rate of change of cross-sectional area, as a function of the distance through the thickness of the membrane between one surface and the other. Examples of such a geometry include a trumpet taper (for example formed in electro-formed nickel—"Veconic", from Stork Veco BV, of Eerbeck, The Netherlands), and a conical taper (for example formed by laser drilling or etch process—"Vecoplus", also from Stork Veco BV). Within such nozzles, surface tension, viscous drag and hydraulic pressure forces will dominate the liquid flow through such nozzles.

When the hydraulic pressure in the liquid is less than the ambient pressure, such nozzle geometries have the disadvantage that at the point during the vibration cycle and when the liquid associated with the nozzle is accelerated towards the bulk liquid, the fluid meniscus within the nozzle may relatively easily travel through the length of the nozzle and towards the bulk liquid such that the nozzle becomes partially or fully air-filled. Therefore, such geometries use additional hydraulic energy in both the negative and the positive pressure segments of the vibration cycle to overcome the viscous drag associated with refilling that nozzle from the bulk liquid in each cycle before it can generate a droplet from the liquid meniscus at the air-side. To prevent excessive meniscus travel within the nozzle during the periodic pressure cycle, a marked and sudden increase in the rate of growth of the cross-sectional area of the nozzle is advantageous, by providing a potential energy barrier to the liquid meniscus as it moves along the length of the nozzle (that is; the surface area of the liquid meniscus must increase more rapidly to overcome the discontinuity in cross-sectional area within the nozzle). In the same way and on the positive segment of the hydraulic pressure cycle, liquid contained within the nozzle and behind the pinned meniscus will quickly refill the small air-filled portion of the nozzle to generate a droplet from the air-side, without losing much hydraulic energy through viscous drag as it does so.

In our WO-A-95/15822 we disclose an alternative method for generating droplets that is based on capillary-waves. In this method, the orientation of the nozzle geometry is reversed relative to the apparatus of U.S. Pat. No. 5,152,456. Instead, the smallest cross-sectional area of the nozzle is located at the surface of the membrane to which the bulk liquid is introduced (liquid-side). The cross-sectional area of the nozzle increases through the thickness of the membrane away from this surface and towards the opposite surface (air-side). As before, at ambient hydrostatic pressure, the liquid meniscus will move to a position of minimum energy where the cross-sectional area of the nozzle is smallest. In this device, the nozzle is not liquid filled, rather the nozzle is substantially air-filled.

As before, during operation a periodic bending-mode vibration is generated in the perforate membrane, harmonically displacing the membrane towards and away from the bulk liquid, resulting in a harmonically varying hydraulic pressure in the liquid near to the liquid-side of the membrane. In addition to this harmonic pressure, the ambient hydrostatic pressure in the bulk liquid (the pressure that exists in the absence of the vibrationally induced harmonic pressure) is reduced relative to the air pressure at the opposite surface of the membrane. In this way the fluid meniscus is prevented from migrating along the nozzle under the influence of the varying hydraulic pressure, and is usually thereby maintained at the smallest cross-sectional area position. The harmonic hydraulic pressure is believed now to act directly on the fluid meniscus to generate a surface capillary wave within each meniscus. This capillary wave is believed to be centred within the circumference of the meniscus and to oscillate in the direction normal to the meniscus to create a capillary wave crest (cusp) at the centre of the nozzle. When liquid near to the cusp of the capillary wave has sufficient vibrational momentum, it a droplet is generated with a characteristic diameter of approximately $\lambda_c/3$ where $\lambda_c$ is the capillary wavelength defined in the following expressions:

$$\rho\omega_c^2 = \sigma k^3$$

$$k = \frac{2\pi}{\lambda_c}$$

where $\rho$ is the liquid density, $\omega_c$ is the angular frequency of the capillary wave, $\sigma$ is the surface tension of the liquid meniscus, and k is the wave number.

In WO-A-95/15822, the preferred condition is that the frequency of the capillary wave is selected from the equations above, such that the diameter of the liquid meniscus within each nozzle is the same as the capillary wavelength, and thereby the droplet ejected from the cusp of each capillary wave has a diameter which is smaller than the diameter of the smallest cross-sectional area of the corresponding nozzle.

Other operating conditions are also found to be satisfactory, including those in which the oscillating frequency of the perforate membrane is lower than that required to produce capillary waves of angular frequency $\omega_c$ (see for example our WO-A-00/47334).

In such devices, the droplet must transfer through the nozzle from the liquid-side to the air side in order to create an aerosol droplet. Successful transfer of this liquid droplet requires that the capillary wave ejects the droplet along the long-axis of the nozzle to minimise the risk of this droplet impacting on the inner surfaces of the nozzle.

These devices have the disadvantage that if such impact-occurs within the nozzle, then at least part of the liquid contained within the impacting droplet deposits upon part of the inner surface of the nozzle. Then a catastrophic failure of droplet ejection can occur. In order to reduce the risk of droplets impacting within the nozzles of such devices, it is advantageous to provide nozzles with large rates of increase of cross-sectional area between the liquid meniscus and the air side of the membrane.

Nozzles with large rates of increase of cross-sectional area between one side of the membrane and the other are difficult to fabricate since relatively small errors in the depth of any forming process from nozzle to nozzle will result in large errors in the cross-sectional area at the intersection between the nozzle and either surface of the membrane (that is, the nozzle aperture). For example, such errors will cause significant variations in the shape and size of the liquid meniscus within the nozzle, arising from the diameter of the meniscus. This will result in a dispersion of capillary wave frequencies across the single perforate membrane, thereby reducing the number of nozzles supporting capillary waves whose optimum excitation frequency is well matched to the vibration frequency of the perforate membrane. Therefore, to enable a nozzle fabrication process to create a nozzle with a large rate of increase of cross-sectional area between the liquid side of the membrane and the air side of the membrane for such devices, it is greatly preferred to have a portion of the nozzle having a slow rate of change of cross-sectional area in the region of the intersection between the nozzle and the liquid-side of the membrane.

Therefore, for both the devices of the types described in U.S. Pat. No. 5,152,456 and those described in WO-A-95/15822 and WO-A-00/47334, it is desirable to provide nozzles having a portion with a slow rate of change of cross-sectional area and another portion having a rapid rate of change of cross-sectional area, and preferable for the transition between those two portions to be marked and sudden. Perforate membranes are also used to create fluid (meaning liquid or gas) pumping devices. In the general case fluid is transferred through the nozzles in both directions, but the nozzles have a resistance to flow which is not equal in both directions, resulting in a net fluid flow in one direction after one or more complete cycles. Devices of this type are disclosed in CH-A-280 618, and WO-94/19609, wherein tapered nozzles in a chamber wall, plate, or membrane are subjected to cyclic fluid flow in both directions through these tapered nozzles, but resulting in a net forward pumping effect.

In CH-A-280 618, it is disclosed that a perforate plate containing tapered nozzles is displaced forwards and backwards in a fluid-filled chamber, and alternatively that a perforate plate is fixed and a separate diaphragm positioned within the walls of the fluid chamber drives the fluid forwards and backwards through the nozzles in the plate. The flow of fluid through the nozzles in this reciprocating plate is restricted by unequal turbulence effects known elsewhere (WO-94/19609) as ‘nozzle’ and ‘diffuser’ flow. Such unequal turbulence effects result in a net transfer of fluid in the diffuser direction of fluid flow, wherein the cross-sectional area of the nozzle is increasing.

In general, such devices transfer a large total volume of fluid backwards and forwards through each nozzle, that is significantly greater than the net pumped volume of fluid. Such devices are therefore subject to more viscous fluid drag than unidirectional pumps (such as positive displacement pumps) providing an equivalent net flow. This requires excess driving power to overcome these viscous losses. Viscous drag in a laminar fluid flow within a narrow channel is characterised by Poiseuille’s equation for capillary flow (Gases, Liquids and Solids, D. Tabor, $2^{nd}$ Edition, Cambridge University Press (1979):

$$Q=\frac{\pi r^4}{8\eta}\left(\frac{p_2-p_1}{l}\right)$$

where Q is the fluid flow rate, r is the radius of the capillary (or nozzle), $\eta$ is the viscosity of the fluid, and $$\left(\frac{p_2-p_1}{l}\right)$$

is the average pressure gradient along the capillary channel. Therefore, the flow rate is strongly limited by the radius of the nozzle, and especially by the smallest radius of the nozzle. In these nozzles this viscosity limitation dictates that a much higher-pressure gradient is required to generate equivalent flow rates to those observed through nozzles with only a slightly larger radius.

Therefore it is desirable to control precisely the radius of the narrowest section of the nozzle geometry while also minimising the length of the same section, in order to maximise the pressure gradient. In this way the viscous drag of the fluid flow within each nozzle will be optimised to provide the same flow performance both from each nozzle in the membrane and from each pumping device.

Perforate membranes are also used in commonly available thickness-absorption and surface-rejecting fluid (meaning liquid or gas) filters, where fluid is transferred through the nozzles in one direction only. Solid particles suspended within such fluid and with all linear dimensions greater than or equal to the smallest diameter of the nozzles contained in the membrane do not pass through that nozzle. Thus a filter membrane of this type will remove those particles, which are larger than or equal to the minimum diameter of the nozzle, from the fluid transferred through the nozzles.

These devices are susceptible to two limitations, which govern the efficiency of such a filter membrane. In the first limitation, the spread in the diameter of the smallest cross-section of each nozzle should be as narrow as possible, in order that the fluid flow through each nozzle is subjected to the same degree of filtration. The spread in nozzle diameter therefore provides a direct indication of the sharpness of the cut-off in the diameter of particulates, which are allowed to pass through such nozzles. In the second limitation, the flow rate of fluid through such filter membranes is determined by the same viscous drag as described above in relation to the fluid pump.

Therefore, it is desirable to maintain a constant radius of the smallest cross-section of each nozzle and furthermore it is also important for a given pressure differential across the faces of the membrane, to maximise the pressure gradient within such nozzles by minimising the length of the smallest cross-sectional portion of the nozzle.

Various laser drilling processes are described in WO-A-99/01317, FR-A-2112586, WO-A-90/08619, U.S. Pat. No. 5,063,280, DE-A-19636429 and EP-A-0729827 in relation to the penetration of materials in a controlled manner using laser radiation. It is also known that the geometry of such penetration is difficult to control accurately below 10 µm diameter. In aerosol devices, nozzle pumps and filter membranes, small nozzle diameters are desirable to respectively achieve inhalable droplets for medical drug delivery to the nose and/or lungs, high pressure fluid pump delivery, and fine high quality particle filters. One reason for this difficulty is the limited control of excess heating and ablation of material from the nozzle. This is commonly addressed through the use of a photo-detector positioned either above or below the material to detect the moment at which sufficient material has been removed from the nozzle, and controlling the laser energy in response to this detection and thereby prevent further unnecessary material heating and ablation. In this way some control may be provided over the depth of the laser machined feature, however this remains insufficient to also accurately control the diameter of the nozzle below 10 µm diameter at the intersection with the opposite surface of the membrane.

Another reason for this difficulty is that the thickness of the material required to be penetrated by the laser beam is substantial; typically of the order of 25 µm to 200 µm for the aerosol generating devices, nozzle-plate pumps and filters described above. However, many of the applications of these devices also require 10 µm diameter or smaller nozzles, which would result in aspect ratios (of minimum nozzle diameter to membrane thickness) of between 2.5 and 20. Known thermal laser drilling techniques, especially those used with metallic membranes, may be controlled to produce only limited aspect ratio features (usually <3). For example, aerosol devices, nozzle pumps, and filter membranes; formed with in such aspect ratio limitations will suffer from low membrane stiffness, and cannot generate (or withstand) the amplitude of the operating pressures described above that are desirable for their effective operation. In order to make a droplet from an aerosol device, whose diameter is such that the droplet is respirable, then the nozzle diameter must be less than ø10 µm. By known thermal laser drilling techniques, this membrane must be less than 30 µm thick, and membranes of such thickness are found not to be robust in use.

However, forming nozzles in the manner suggested in the prior art using laser drilling techniques leaves the nozzles with relatively course surface finishes and therefore it is desirable to polish or smooth the surfaces. A typical way of doing this would be to electro-polish them, but, with tapered nozzles this would involve removing material from the internal surface of the nozzle with the result that the diameter of the smaller aperture of the nozzle is increased beyond the desired value, as the electro-polishing process removes material generally normal to the surface within the nozzle at any point, making it extremely difficult to control the diameter unless the shape is known very precisely and the control is achieved also very precisely.

There is a need therefore for a process which can overcome this difficulty.

According to the present invention there is provided a method of forming perforate membrane for use in a liquid transport device, by applying laser energy selectively to a first surface of the membrane in the form of a pulsed, focused beam to form a plurality of nozzles each having a throat portion opening at one end through the opposite surface of the perforate membrane and a smoothly curved outwardly diverging portion extending from the other end of the throat portion to the first surface of the perforate membrane, characterised by thereafter electro-polishing the first surface of the membrane and the surface of the diverging portion of the nozzles to remove surface imperfections, and controlling the electro-polishing so as to remove material from the surface of the diverging portion of the nozzles to a depth less than the length of the throat portion.

Because of the presence of the throat portion, essentially narrower than the diverging portion, removing material from the diverging portion by the electro-polishing process substantially affects only the length of the throat portion, so that the diameter remains substantially unaffected.

The invention also includes a perforate membrane manufactured by such a process and a fluid transport device including such a membrane.

The laser energy may be applied in two steps to form the nozzles, between which steps the distance between the laser focus and the first surface of the membrane and/or the pulse energy of the laser beam is adjusted.

The nozzle described in the present invention contains such a throat portion with a relatively constant cross-sectional area, extending between the opposite surface of the membrane and a diverging portion of the nozzle that intersects with the first surface of the membrane. This provides a reliable and repeatable throat diameter, and also provides a relatively short throat portion compared to the thickness of the membrane, thereby increasing the pressure gradient along the throat portion of the nozzle and in so doing this will limit the effects of viscous drag. The throat portion dominates the viscous flow even through relatively thick membranes, since the diverging portion passes fluid relatively freely to the throat portion because it has a cross-sectional area which is always greater than the throat portion. Therefore, this nozzle provides a flow channel, which provides a method for optimising the viscous drag associated with such fluid pumping devices as disclosed in CH-A-280 618 and WO-94/19609.

We have developed a percussion laser drilling process that addresses limitations of other laser processes, to create a nozzle of controlled diameter and taper. This process may be employed on a wide range of membrane materials, including metals, ceramics, glass and polymers. In addition this new process enables high-speed automatic focus control necessary for manufacturing these perforate membranes in high volume.

In summary, this method operates as follows:

a. Provide a focused laser spot, such that the distance between this laser spot and the first surface of the membrane can be altered. The optical axis contains the positions of maximum laser energy density at all points along the focused portion of the laser beam. The optical axis is arranged such that it is incident to the membrane at the desired angle of the nozzle to the membrane surface, which is usually (but not necessarily) 90° for planar membranes. This angle may be different from 90° particularly where the membrane is non-planar.

b. Position the membrane material such that the laser focus will fall either above or below the thickness of the membrane. By changing this distance along the optical axis between the first surface of the membrane and the laser focus position, we can control the area of the illuminated surface of membrane.

c. Illuminate the first surface of the membrane with pulsed and focused laser radiation with a fluence in excess of the material ablation threshold over a controlled surface area. Material is thereby removed from the thickness of the material through and below the illuminated surface. After a predetermined number of pulses, known by prior experiment or otherwise to be insufficient for the laser beam to penetrate through the thickness of the material, the laser radiation is switched off. This step forms the diverging portion of the required nozzle.

d. Reduce the distance between the laser focus position and the first surface of the membrane by a predetermined amount along the laser axis such as to reduce the area of the surface illuminated at a given illumination intensity in accordance with the cross-sectional area of the required nozzle at the interface between the diverging portion and the throat portion of the nozzle. Also adjust the pre-set laser pulse energy such that the laser fluence over this smaller surface within the nozzle will be approximately equivalent to that used to create the diverging portion.

e. Illuminate the membrane for a predetermined number of pulses to remove the remaining material thickness within the throat of the required nozzle. The pulse at which laser light first penetrates through the whole thickness of the material is detected by a photo-detector positioned on the opposite surface of the membrane.

f. At the same or similar settings, further laser pulses are applied to the nozzle after the first penetration pulse to clear unwanted debris from the nozzle intersection with the opposite surface, to create a substantially round and smooth cross-sectional area of the nozzle.

g. The number of laser pulses required to first penetrate the through the throat of the nozzle $N_t$ is compared to the number of pulses predetermined for the creation of such portion $N_{set}$ in the following way:

$$N_t - N_{set} = N_{error}$$

h. If $N_{error}$ is greater than 0, then there was an insufficient membrane material removal rate during the formation of this nozzle. In the absence of other uncontrolled effects, this is usually due to small variation in the set distance between the initial laser focus position and the first surface of the membrane, relative to that optimised for the predetermined laser settings. To correct for this variation, the distance between the initial laser focus position and the membrane surface is reduced by a small and predetermined amount. Similarly, if $N_{error}$ is less than 0 then the distance between the initial laser focus position and the membrane surface is increased by a small and predetermined amount.

This method results in the formation of the nozzle geometry described above, in which the diverging portion of the nozzle is formed first through a predetermined portion of the thickness of the membrane. The throat portion is then formed to connect the diverging portion of the nozzle to the opposite surface of the membrane through the remaining thickness of the material.

The divergence of the diverging portion of the nozzle arises from the nature of the laser ablation process. This process (which is a complex process and imperfectly understood) is now described.

The laser radiation transfers energy into the surface of the material. This energy causes highly localised heating of the membrane material on and under and around the illuminated surface. If the laser power density is sufficiently high, then direct ablation of the material occurs at the membrane surface. At a lower power threshold, the laser energy transfers into thermal energy in both the molecular structure and electron distribution (especially in the case of metals) within the material, resulting in the formation of a localised molten pool of material (thermal melt). Below this lower power threshold the laser energy will cause mechanical and structural damage to the material as the local laser heating anneals and deforms the material, but will not remove it.

During the ablation process, material is removed more quickly from areas of the illuminated surface where the laser power density (fluence) is highest. At the initial pulse, this will match the profile of the incident laser power density over the surface of the membrane. In a focused laser beam, this power distribution may be approximated to a Gaussian profile, thereby concentrating the ablation towards the centre of the illuminated surface. As the ablation process proceeds through the thickness of the material, a curved surface begins to form whereby there is a smooth gradient between the deeper centre and the perimeter of the illuminated surface. As the ablation process moves deeper into the thickness of the membrane, and after a predetermined number of incident laser pulses, the diameter of the illuminated membrane surface and the incident laser power density is changed by relative adjustment of the laser focus position and the laser pulse energy. This results in either a reduction, or an increase in the ablation rate as a function of the ablation depth, depending on whether the ablating surface is moving away from or towards the laser focus position, respectively. For better process stability, the first surface of the membrane is preferably positioned beyond the laser focus position in order that the ablation rate naturally reduces as a function of ablation depth to form the diverging portion. In this way it is found that better control may be exercised over the depth of the diverging portion, and thereby over the position of the interface between the diverging and the throat portions of the nozzle within the thickness of the membrane material.

In the case of metallic membranes, the wall of this curved surface becomes lined with thermal melt, which solidifies to form a relatively smooth re-cast melt layer. Furthermore, the smooth walls now begin to reflect at least some of the incident laser radiation towards the centre of the curved surface. This further increases the material ablation rate at the centre of the illuminated surface. Above the surface, the high energy of the ablation process forms a plasma. This plasma has the effects of scattering and absorbing some of the incident laser radiation, thereby distribution thermal energy over the membrane surface. The pressure within the plasma also drives some of the laser melt away from the inside of the curved surface at the ablation site, from where it flows into a radially expanding distribution of thermal melt which re-casts at and beyond the intersection of the diverging portion with the first surface of the membrane.

These processes described above result in a curved and diverging cavity in the first portion of the membrane thickness wherein the cross-sectional area of the cavity reduces between the first surface and the base of the cavity within the thickness of the membrane. This cavity will approximate to a part-spherical profile in general to reflect the incident laser beam profile, and the distribution of re-cast melt around its circumference.

The bottom of this diverging portion is substantially flat with a tangential plane being parallel to the plane containing either surface of the membrane. This ensures that there is a relatively well defined surface through which the throat portion of the nozzle may be formed through the remaining thickness of the membrane. In the method described above, the throat portion is formed using the portion of the laser beam near to the laser focus position. The laser beam profile near to the laser focus position is limited by diffraction to form a curved waist between the converging and diverging portions of the beam, rather than the sharp point implied by a simple linear ray diagram. This waist feature provides a relatively slowly changing beam profile at various positions orthogonal to the beam axis and near to the laser focus position. Therefore, as the laser beam is used to form the throat portion through the remaining thickness of the material, the laser pulse energy remains substantially un-changed. Additional laser pulses are applied after the first pulse to penetrate the throat portion is detected by a photodetector positioned on the opposite side of the membrane to the incident laser beam. This process results in a relatively smooth-walled and slowly varying cross-sectional area along the length of the throat portion.

The number of pulses, as detected by the photodetector, required to penetrate the throat portion to form the preceding nozzle is used to control the distance between the initial laser focus and the first surface of the membrane for the subsequent nozzle to be formed at an adjacent position. This method is practised by the inventors for controlling the initial focus position of the laser beam at a constant distance from the first surface of the membrane, thereby correcting for normal variations in the flatness of the membrane. This focus controlling process is integrated within the laser drilling process and thereby presents no additional step or time penalty to execute such process. In this way, the laser focus may be accurately controlled relative to the surface of the membrane in a high speed manner (which is desirable when forming many nozzles in each membrane, for example to enable high volume manufacturing of such perforate membranes).

Especially in the case of metal membranes, and resulting from the thermal nature of the laser process used to form each nozzle, re-cast melt is deposited on the inner surface of the nozzle and on both surfaces of the membrane surrounding each nozzle. This re-cast melt has a capillary-like structure which causes unwanted fluid flow over the surface of the membrane, resulting especially in uncontrolled droplet creation from aerosol devices. Also, the brittle nature of the re-cast melt presents a significant risk of fracture of some of this material during device operation. This can result in potentially dangerous particulate contamination in the fluid delivered by the fluid transport device.

Particularly in the case of metallic membranes, in order to remove the unwanted re-cast melt from the surface of the membrane and from within the nozzles, it is desirable to use a cleaning process prior to the completion of the membrane manufacture. We have found that electropolishing provides such a process.

The electropolishing process is well known in the metal finishing industry, and can be referenced as a standard process, see for example L. J. Durney, Electroplating Engineering Handbook, Part 1, Ch. 3-D, Fourth Edition, Chapman & Hall, NY, 1996, and J. Brown, Advanced Machining Technology Handbook, Part VII, ISBN 007008243X, 1998. Electropolishing provides a high quality surface finish to a range of metal surfaces including stainless steel, titanium, nickel, gold, Hastalloy, copper, bronze, brass, beryllium-copper alloys and aluminium. The electric field is applied between an anode to which the metal component (membrane) is attached and a cathode, immersed together in a liquid electrolyte solution. At the surface of this component, the electric field lines impinge at right angles to the conducting surface. At regions of the surface where the radius of curvature is small, the electric field gradient becomes very steep, attracting a higher rate of dielectrophoretic migration of the electrolyte towards these regions. As a result of this, these regions are etched most strongly by the electrolyte, to remove metal ions from the sharp surface features on the membrane surface. This preferential material removal acts to increase the radius of curvature of the metal surface, and thereby smooth the surface by removing sharp features. Advantageously, we have defined a new method of electropolishing (see description related to the FIG. 5) in which the electropolishing may be applied selectively to each side of the membrane, thereby preventing over-etching of the finer details of the nozzle geometry, in particular the diameter of the throat portion.

The inventors have found that conventional electropolishing is inadequate to remove undesirable re-cast melt formed by the above laser drilling process; but have also found a new method of electropolishing related to the specific geometry of the nozzles claimed herein is successful at removing that undesirable re-cast melt whilst preserving the desirable features of the laser drilled nozzle geometry described above.

Thus, the nozzle geometry contains at least two portions distributed through the thickness of the membrane. The both portions may be substantially circular in cross-section, characterized by varying cross-sectional area.

The first portion is preferably a substantially cylindrical geometry intersecting the opposite surface of the membrane at one end. This first portion is known as the throat of the nozzle. At the opposite surface, the intersection with the throat portion provides a well defined and substantially circular opening which usually contains the narrowest cross-sectional area of the whole nozzle. In some cases the throat portion will also contain a small increase in cross-sectional area through the membrane thickness in the direction away from the opposite surface.

The second portion is characterised by a diverging cross-sectional area through the thickness of the membrane, connecting to the other end of the throat portion and diverging in the direction between the other end of the throat portion and the first surface of the membrane. The throat portion and the diverging portion of the nozzle are substantially coaxial.

At the intersection between the throat portion and the diverging portion, the cross-sectional areas are continuous, however the rate of change of the cross-sectional area as a function of distance through the membrane thickness shows a sudden and marked change at the intersection. Therefore at this intersection, a step exists between the two portions and within the thickness of the membrane.

More than two portions may also be present in such nozzles. In that case a number of diverging portions are distributed between the other end of the throat portion and the first surface. These diverging portions are distributed in order of increasing cross-sectional area between the other end of the throat portion, and the first surface of the membrane. The cross-sectional areas at the intersection of all portions within the thickness of the membrane are continuous. In the same way as in the two-portion nozzle, the rate of change of cross-sectional area, as a function of distance through the membrane thickness, shows a sudden and marked change at the intersection between the throat portion and the first diverging portion connected thereto.

BRIEF SUMMARY OF THE FIGURES

One example of a membrane and its method of manufacture according to the present invention will now be described with reference to the accompanying drawings, in which:—

DETAILED DESCRIPTION OF THE INVENTION

Figure 1:
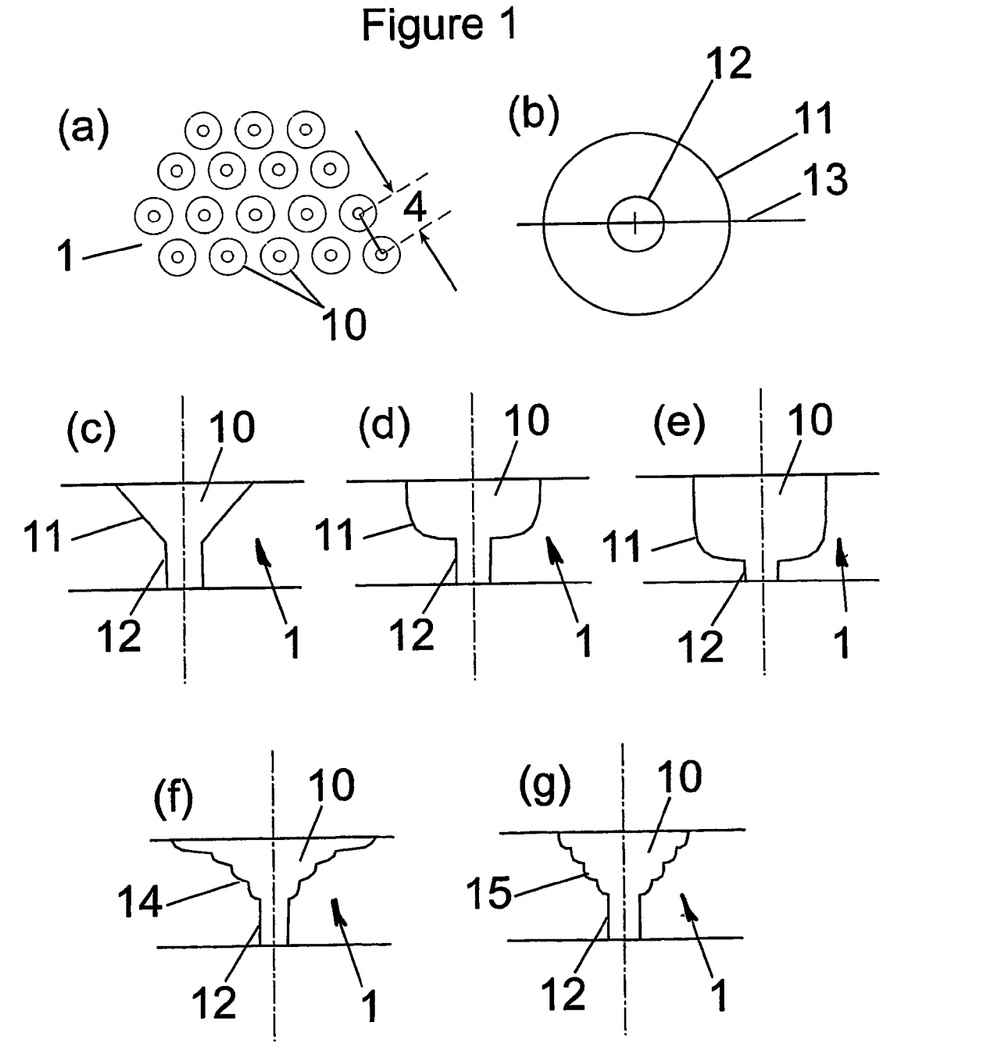
FIG. 1(a) to 1(g) are drawings of variations in the geometry of nozzles in a membrane.

FIG. 1(a) shows, in plan view, a portion of the central perforated area of membrane 1, which is a flat disk typically made of AISI 316 or AISI 302 stainless steel and is of thickness 50 µm and of overall diameter 12 mm (not shown). This central perforated area may be 8 mm in diameter (not shown) within which nozzles are evenly distributed in a triangular pattern. The nozzles 10 are separated by a distance 4, which is controlled to achieve the required net fluid flow rate through the perforate membrane. For example, this distance may be between 40 µm and 500 µm separation and more usually is set to 100 µm, which translates to more than 5,800 nozzles within each membrane.

FIG. 1(b) shows the geometry of a nozzle 10 contained in a perforate membrane 1 according to the present invention contain two primary portions, a throat portion 12 and a diverging portion 11. Note that these two portions are concentric.

FIGS. 1(c), 1(d), and 1(e) illustrate cross-sectional views through three examples of variations of the profile of the diverging portion 11 along the chord 13 of FIG. 1(b). In FIGS. 1(c) and 1(d), the length, diameter and taper of the throat portion 12 remain substantially unchanged. However in FIG. 1(e) the throat portion 12 has been shortened within the fixed thickness of the membrane to accommodate a larger diverging portion 11. Such changes may be controlled by suitable adjustment of the pre-set laser drilling parameters, as discussed below in relation to FIGS. 6 and 7.

FIG. 1(c) shows the diverging portion 11 with a frusto-conical profile resulting from a constant increase in cross-sectional area. FIG. 1(d) shows the diverging portion 11 with a smoothly curved, outwardly diverging portion resulting from a maximum rate of change of cross-sectional area at the intersection between the throat portion 12 and the diverging portion 11, where this rate of change reduces towards zero at the intersection between the diverging portion 11 and the first surface. FIG. 1(e) shows a diverging portion 11 that penetrates deeper within the membrane thickness, thereby shortening the throat portion 12. Such variations are important for controlling the viscous drag of different fluids within such a nozzle, for example contained within an aerosol device.

FIGS. 1(*f*) and 1(*g*) illustrate variations on the nozzle geometry achieved through multiple laser drilling steps to form the diverging portion 14 and 15 respectively. We have found that the diverging portion may be altered to change the distribution of rates of change of cross-sectional area. For example, FIG. 1(*f*) shows a diverging portion 14 where the rate of change of cross-sectional area is greatest towards the intersection between the diverging portion and the first surface, to form a trumpet-shaped taper. Such a diverging portion may be formed using the laser drilling process to create 4 steps of the laser power density and/or of the illuminated surface area. Note that the throat portion 12 maintains the discontinuity of the rate of change of cross-sectional area at the intersection with the diverging portion 14.

Similarly FIG. 1(*g*) shows how multiple steps used in the formation of the diverging portion 15 may be used to form customised variations of the rate of change of cross-sectional area to suit particular device applications. Note that in this case also, there is a discontinuity in the rate of change of cross-sectional area at the intersection between the throat portion 12 and the diverging portion 15.

The smallest diameter of the throat portion, which is usually at the intersection between the throat and the opposite surface, may be controlled at least in the range between 1.5 μm and 30 μm, and, for droplet generating devices, is more usually set to between 2.5 μm and 3 μm. For membranes for use in such devices, the diameter of the diverging portion 11 at the intersection with the first surface may be between 10 μm and 50 μm, and is more usually set to between 35 μm and 40 μm. The ratio between the length of the throat portion to the length of the diverging portion of the nozzle may be between 1 and 0.3, and more usually is set to 0.5, in which case the length of the throat 12 is approximately 17 μm and the length of the diverging portion is 33 μm, through a membrane whose thickness is 50 μm.

A laser drilling method is used to create these nozzles, whereby the geometry of the diverging portion substantially conforms to a part spherical profile, as shown in FIG. 1(d). The laser drilling process is carried out using the laser apparatus shown in FIG. 2, which includes an X30-532QA diode-pumped Nd-YAG laser head 20 driven by a T40-8THHSS40 power unit (not shown) (both supplied by Spectra Physics Lasers, Inc., 1330 Terra Bella Avenue, Mountain View, Calif. 94043, USA); a Pockel's cell modulator 21 (Model: LM0202 P5W, Linos Photonics GmbH, of Goettingen, Germany); a computer controller 25; an x-y plane translation stage 29, and a z-plane translation stage 28 ('Physik Instrumente M-125-11' from Lambda Photometric Ltd. of Harpenden, UK); suitable beam steering optics 22 which are all standard equipment (supplied by Elliot Scientific Ltd. of St. Albans, UK); an objective lens 23 which is a 14 mm (NA=0.17) microscope objective; a photodiode 26 located below the sample stage 24 as shown and which comprises a BPX65 fast response photodiode (from RadioSpares); and a suction tube 27 provided to remove ablated material.

Figure 2:
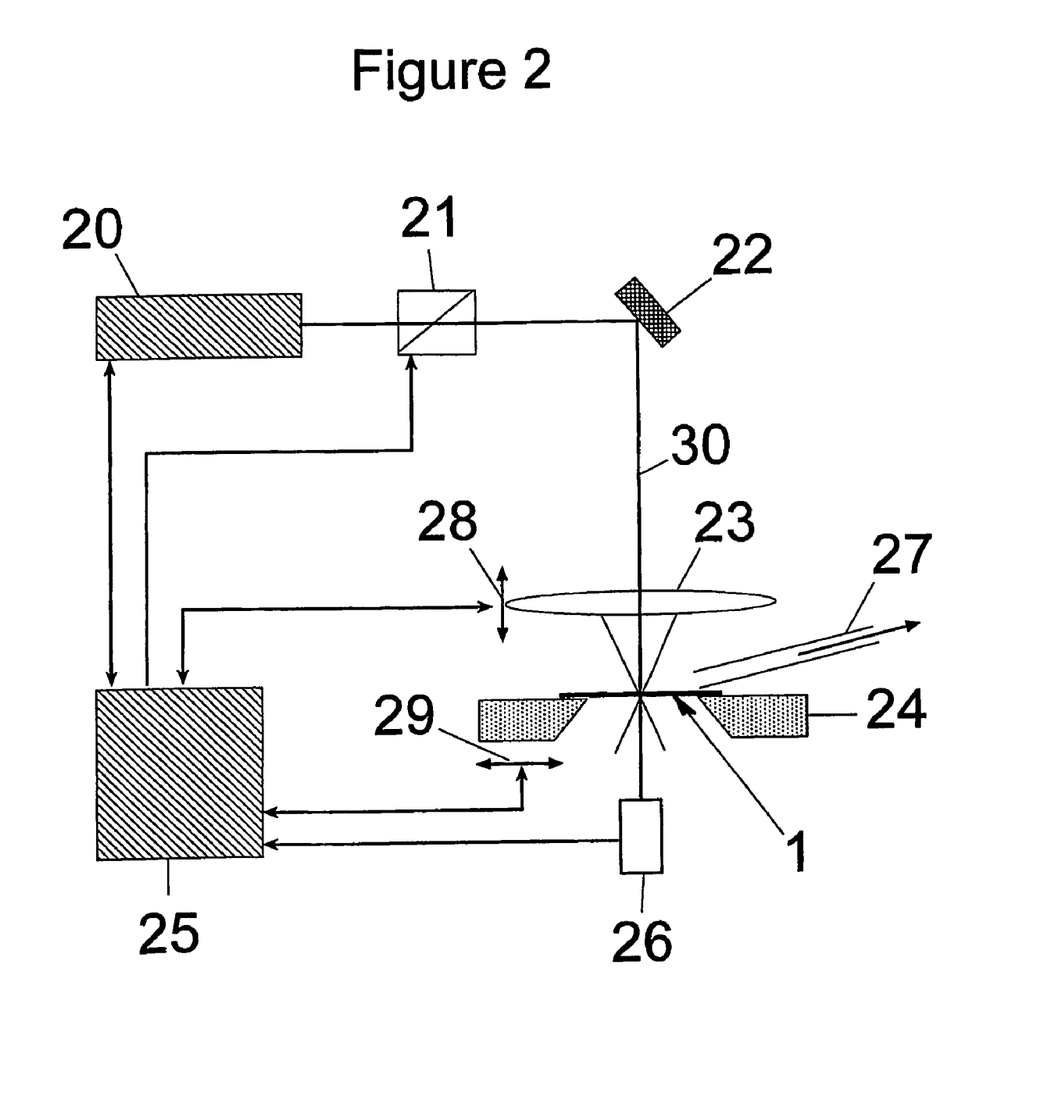
FIG. 2 is a schematic of a laser apparatus for creating nozzle apertures in a membrane.

The controller 25 controls the laser head 20, the Pockel's cell 21, and the x-y-z translation stages 29, 28, and receives signals from the photodiode 26. The process of drilling the nozzles within the membrane is discussed more fully in relation to FIG. 3, below.

FIGS. 3(a) to (f) illustrate the laser drilling process used to create the nozzles 10 in the membrane 1. FIG. 3(a) shows a schematic of the focus of the Gaussian laser beam, as generated by the objective lens 23. At the focus, the distribution of photon energy becomes diffraction limited, giving rise to a curved beam waist 31 rather than a singular focal point. The following relation gives the width of the beam waist:

$$\alpha_0 = \frac{2\lambda}{NA}$$

where NA is the utilised numerical aperture of the lens 23, and $\lambda$ is the wavelength of the incident laser light. In this case, NA=0.17 and $\lambda$ is 532 nm, therefore $\alpha_0$ is approximately 6.3 μm.

Notice that the smallest cross-sectional area at the laser focus 31 is at the focal length 32 of the objective lens 23. Notice also that the distribution of photon energy is symmetrical both above and below the laser focus.

To form nozzles, the controller cycles through the settings illustrated in FIGS. 3(b), (c), (d), (e) and (f). In the step shown in FIG. 3(b), the controller positions the z-stage 28 such that the laser radiation will illuminate (at a given intensity) a certain area of the membrane's surface. In this case, the membrane 1 is positioned with its upper surface 2 a certain distance 33 below the objective lens, such that the length 33 is greater than the focal length 32. Once the z-stage 28 is at the correct position 33, the Pockel's cell 21 is triggered to allow a number of laser pulses through the steering optics 22 to illuminate the surface 2, as illustrated in FIG. 3(c). Each pulse is 10 ns in duration, and with a peak energy of 10 mJ per pulse. After a pre-set number of pulses have passed through the Pockel's cell 21 (usually 20 pulses), as counted by the controller 25 in response to the pulse triggered signal from the laser 20, the Pockel's cell 21 is used to extinguish the transmitted laser radiation to the membrane 1. This first step results in the formation of the diverging portion 11 of the nozzle 10 by the process of laser ablation, to form a part-spherical geometry through approximately ⅔ of the membrane thickness.

Following this first laser drilling step, the controller 25 moves the z-stage 28 to a new distance 35 between the objective lens 23 and the surface of the membrane 1, as shown in FIG. 3(d). Alternatively or in addition, the controller 25 sets a lower peak laser pulse power through the Pockel's cell 21. When all these conditions are set, the controller 25 then triggers the Pockel's cell to deliver a series of pulses through the steering optics and onto the surface of the membrane 1, to commence ablation of the throat portion 12, as illustrated in FIG. 3(e). Again, these pulses are 10 ns in duration, at 532 nm wavelength, however now with a reduced peak energy of 15 μJ per pulse.

During this series of pulses, the controller 25 counts the number of pulses delivered to the membrane surface 2, and at the same time monitors the output from the photodiode 26 (not shown). The pulse count at which the photodiode 26 first detects a pre-set increase in optical power is used by the controller to determine the number of pulses used to penetrate the throat portion 12 of that nozzle 10. This number is then compared to a pre-set target number (usually 11 pulses in this example) to determine the error associated with the drilling process used to create that nozzle. Following the first pulse detected by the photodiode 26, the controller 25 delivers a further pre-set number of pulses through the Pockel's cell 21 to the membrane 1. This is done in order to fully form the throat portion 12 (usually 10 pulses in this example) and to create a substantially circular cross-section within the throat portion 12 at the intersection between it and the surface 3 of the membrane 1. Following this series of pulses, the throat portion 12 of the nozzle 10 is fully formed through the remaining ⅓ of the thickness of the membrane, as illustrated in FIG. 3(f). The step illustrated in FIG. 3(e) is controlled to obtain the desired minimum cross-sectional area of the nozzle 10.

Figure 3:
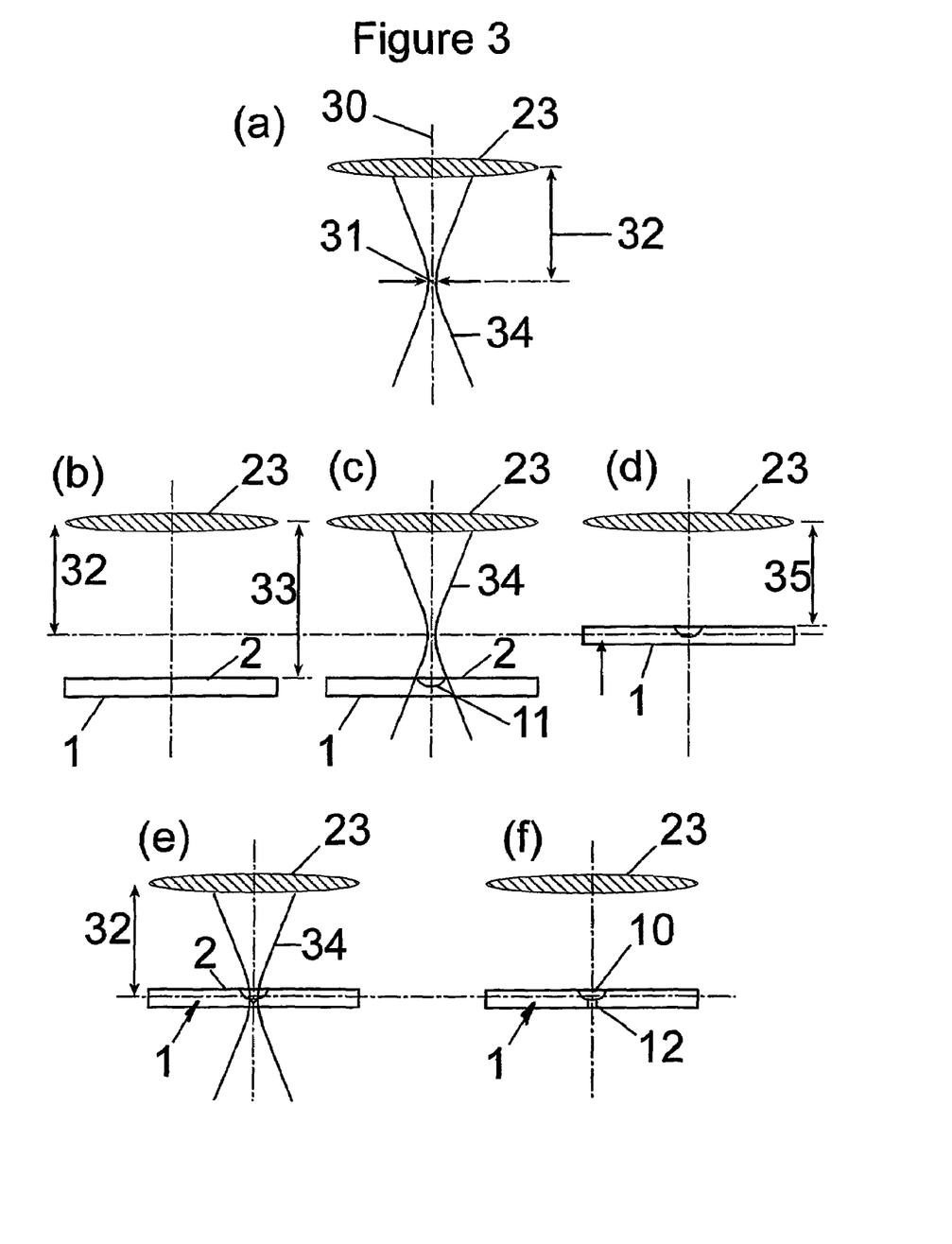
FIG. 3 is a partial cross-sectional view of the membrane illustrating steps in the process of manufacture.

The error associated with the drilling process is used to determine small variations in the rate of ablation of the membrane material. This variation is usually due to variations in the laser fluence incident on the surface of the membrane. When the delivered laser power is stabilised, changes in laser fluence only occur due to changes in the illuminated surface area of the membrane 1. In a focused laser system, such changes are due to variations in the distance between the laser focus position and the membrane surface 2, due to errors in membrane flatness. Variations in the membrane height over the nozzle drilling area are corrected by adjusting the distance between the membrane surface and the laser focus position, by adjusting the z-stage 28. This adjustment is made in response to the error associated with the drilling process in the following way:

$N_t - N_{set} = N_{error}$ $N_{error} = 0; \delta z = 0$ μm, $N_{error} > 0; \delta z = +7$ μm, $N_{error} < 0; \delta z = -7$ μm.

where δz is measured in the same direction as the z-stage 28 motion in the step between the ablation of the diverging and the throat portions of the nozzle.

In this case, the variation in the gap is controlled using a simple algorithm, with a linear step of 7 μm in the z-axis. It is recognised that this algorithm may be developed further, for example to incorporate proportionality between the magnitude of $N_{error}$ and the correction $\delta z$. However, we have found that this simple algorithm provides adequate control over the pulse count, and thereby control of the nozzle geometry. For example, this algorithm, in combination with the method described above, may be used to create a membrane containing 5800 nozzles, each to within ±0.2 μm error of a target diameter of 2.8 μm for the throat portion diameter. It is noted also that this process provides a suitable method for controlling the gap between the laser focus position and the membrane in order to enable high-speed membrane-manufacturing rates that are within reasonable commercial limitations. For example, each membrane component containing 5800 nozzles may be drilled in less than 100 seconds.

This apparatus has been described with reference to drilling holes in stainless steel, and may be applied in a similar manner to a wide range of metals including aluminium, brass, copper, Constantan, Hastalloy, nickel, niobium, titanium, tungsten, tantalum, Waspalloy, zirconia. It is clear that a similar predetermined increase in laser transmission through the throat 12 of the nozzle 10 is detected by the photodiode 26 and may be used to control the drilling process with less opaque materials such as plastics, glass and silicon. In such materials, it is also clear that different laser sources (i.e. at a different wavelength of light) may be used, for example an Excimer laser at 192 nm to 351 nm wavelength may be used to ablate plastics, glass, silicon.

Figure 4:
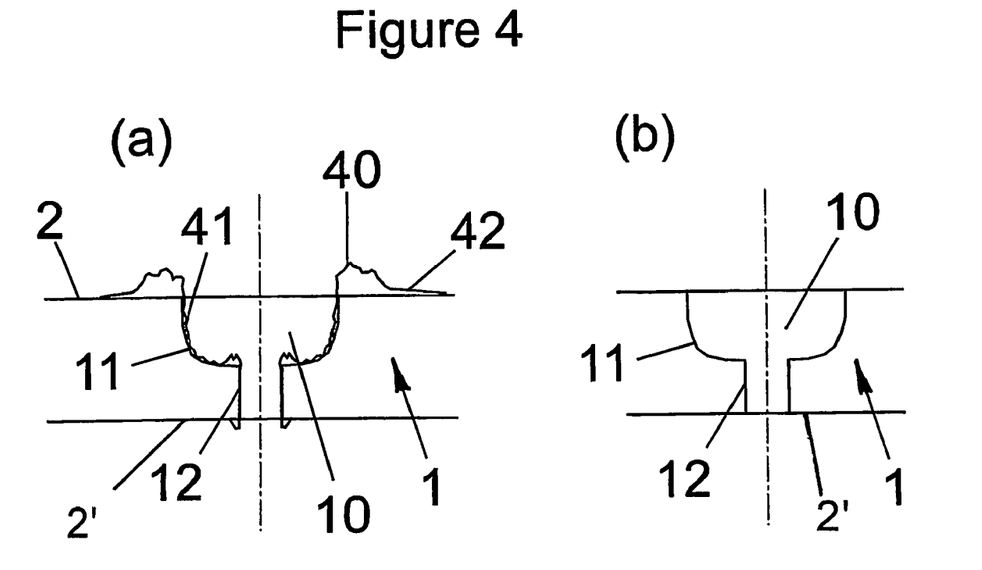
FIG. 4 illustrates the membrane cross-section before and after electropolishing.

FIGS. 4(a) & 4(b) illustrate the effect of electro-polishing to remove the re-cast thermal melt and other debris from within and around the laser drilled nozzle. The recast melt 40 is shown in FIG. 4(a) where it is substantially localised into two annular features near to the upper rims of the diverging portion 11 and the throat portion 12, of the nozzle 10, known as crowns. Over the remaining surfaces within the nozzle 10 a thin layer of recast melt 41 is distributed into a rippled structure to reflect the pulsed nature of the ablation process used to create such nozzle. On the upper (first) surface 2 of the membrane there is an expansive and radial distribution of recast melt 42 which is loosely connected to the crown on the diverging portion 11 near to the nozzle exit, and with a disconnected distribution of recast melt fragments further from the nozzle. FIG. 4(b) shows the nozzle 10 after post-processing by electro-polishing, in which the recast melt has been removed from within and around the laser drilled nozzle. Also a quantity of membrane material is removed from a thin layer at the opposite surface 2' of the membrane 1, and also within the nozzle 10. This layer thickness is carefully controlled to preserve the geometry of the nozzle (usually less than 1 μm thick).

As a preliminary finishing step, the membrane 1 is degreased using a non-chlorinated solvent. An acid-solution is used to clean the membrane 1 to remove the carbonised outer surface of the laser drilled nozzle, for example a solution of Nitric-HF (10% $HNO_3$, 2% HF) at between 50° C. and 60° C. An alternative pre-cleaning process that has been used is to heat anneal the stainless steel membrane 1 to approximately 1060° C. in a vacuum, then rapid quench the membrane in air, water, or oil at room temperature. This process has the advantage of releasing any residual local stresses created in the membrane 1 through the drilling process. Additionally, and in the same way as the Nitric-HF pre-cleaning method, rapidly quenched membranes shed the brittle and carbonised outer surface of the nozzles due to thermal shocks and brittle fracture.

After any of the above pre-cleaning processes, the laser drilled membrane surface regains a metallic appearance to the naked eye. The surface of the membrane around and within the nozzles now comprises recast thermal melt that is relatively firmly connected to the surface of the nozzle. This remaining material may now only be removed by mechanical abrasion or focused chemical etch processing such as electro-polishing.

Figure 5:
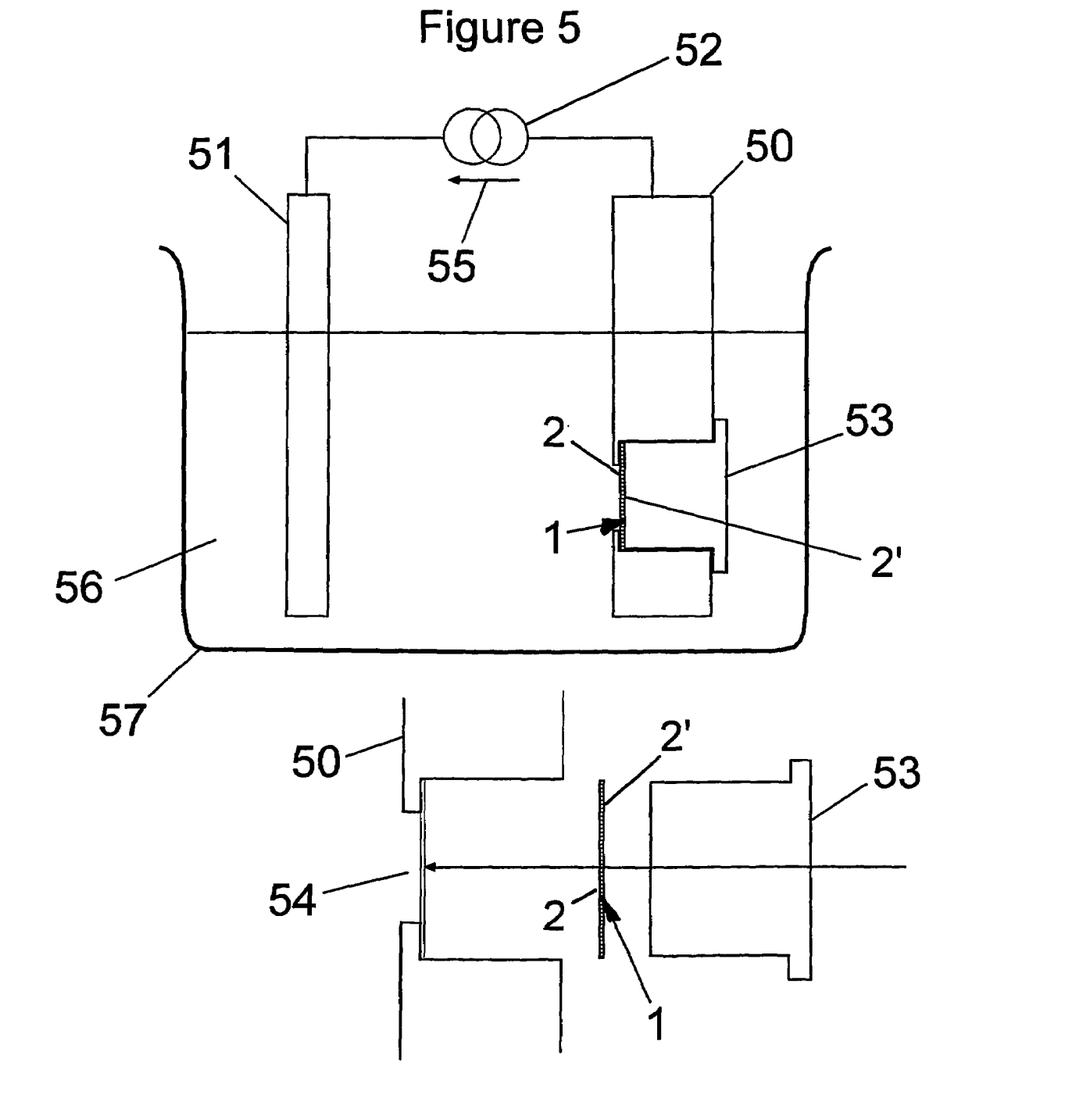
FIG. 5 is a cross-sectional view through an electropolishing system used in the process of the invention.

FIG. 5 shows a schematic layout of the electro-polishing apparatus used to post-process the membranes 1 after laser drilling and pre-cleaning. Advantageously, and due to the asymmetry of the nozzle geometry, the titanium anode 50 has been modified to position the membrane 1 such that the electro-polishing etch is directed only to one side of the membrane at any time. A plug 53, made from PEEK, seals the rear surface 2 of the membrane 1 from the electrolyte 56. The side of the anode 50 facing the titanium cathode 51 has an aperture 54 cut in such a way to expose the front surface 2' of the membrane 1 to the electrolyte, and the electric current generated between the anode 50 and the cathode 51. Using this modification, the etch processes may be applied wholly to the front surface 2 of the membrane 1, thereby controlling the quantity of material removed from that surface in order to maintain all of the fine details of the nozzle geometry.

In general, for aerosol droplet applications, the 'air-side' 2 of the membrane should be cleaned to improve droplet ejection control. Therefore, at least that side of the membrane should be exposed to the etchant electrolyte. The anode 50 and the cathode 51 are immersed in the electrolyte solution 56, usually comprising oxalic or phosphoric acid usually stabilised at 80° C. Alternatively, a mixture of 36% sulphuric acid, 50% glycerine and 14% water may also be used. In order to maintain a homogeneous solution the electrolyte is usually circulated with a magnetic stirrer (not shown).

The electrical power source 55 provides a constant current in the circuit between the cathode 50 and anode 51, and through the electrolyte for a pre-determined period of time as shown by the arrow 55. This current flow removes a controlled quantity of metal ions from the anode 50 and from the exposed membrane surface, while at the same time, cations are deposited on the cathode 51. The removal of ions from the metal surface 2 of the membrane 1 is greatest in the regions of that surface where the electric field gradient is highest. In this way it is believed that the ionic species responsible for the etching process within the electrolyte are able to migrate to these regions under dielectrophoretic migration and that these species are thereby able to overcome the build up of the charge double layer in the electrolyte within the gap between the electrodes. These regions of high electric field gradient near to the surface are associated with conducting surface structures where the geometric radius of curvature is smallest. This electric field 'focusing' on the regions with the smallest radii of curvature first, eventually reducing these features to leave resulting in a flat and highly polished metal surface.

The quantity of charge removed from the surface 2 can be related to an average depth of material removed from the surface 2 of the membrane. For membranes described in this application, typical current values are set to between 75 mA and 240 mA for between 50 seconds and 100 seconds. When combined with the surface area of the exposed membrane, this relates to a total charge removal of between 0.15 C/mm$^2$ and 0.25 C/mm$^2$. If we assume that the ions removed are all charged with a valance of 2+ (e.g. $Fe^{2+}$ ions), and that the packing density of atoms within the stainless steel surface 2 is approximately 60%, then this removal equates to an average thickness of 0.1 μm is removed from the exposed front surface 2 of the membrane. However, the focusing effect of the electric field gradient will result in a distribution of etch rates across the surface 2 of the membrane 1. For nozzles created in AISI 316 stainless steel membranes, where a single-sided electro-polish is applied to the front surface 2 of the membrane, the total charge removal is optimised to 0.19 C/mm² in order to provide a high quality of surface finish and to minimise the incidence of over-etching.

Advantageously and in order to further reduce the risk of subsequently over-etching of the nozzle throat portion 12 during the post-process cleaning and electro-polishing, the length of the throat portion 12 may be increased through appropriate adjustments to the drilling process. This is indicated by the difference between the nozzles shown in FIGS. 1(c) and 1(d). This ensures that for a certain spread in the geometry of the throat portion, resulting from the tolerance associated with the high-speed laser drilling process, more nozzles will have sufficient length of throat portion 12 to prevent over etching during the electro-polishing process.

Figure 6:
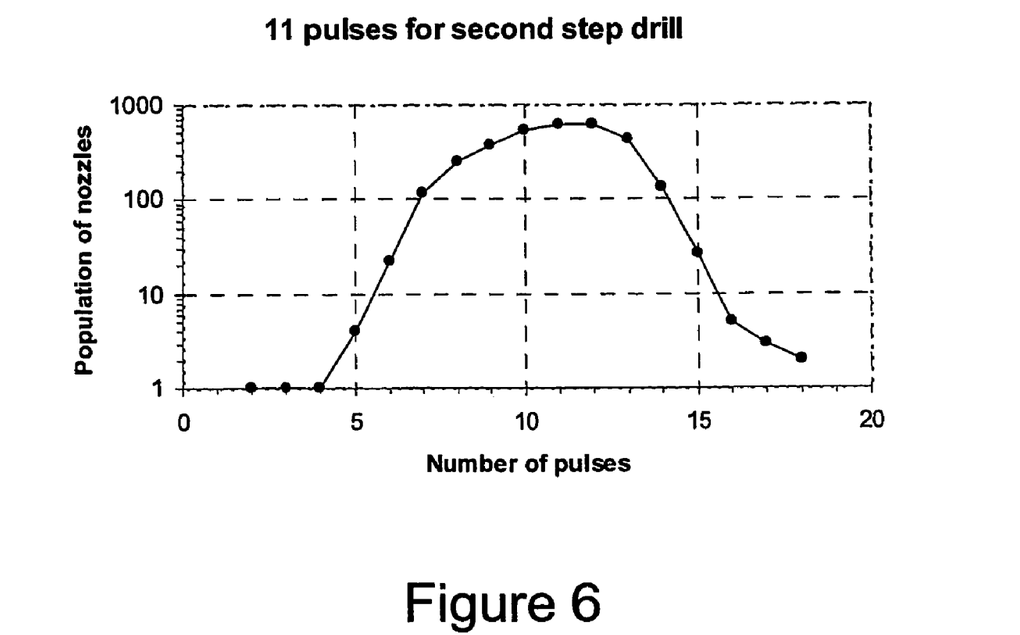
FIG. 6 is a chart illustrating the spread of pulses required to form the throat portion of nozzles in a single membrane, when the target number of pulses is pre-set to 11.
Figure 7:
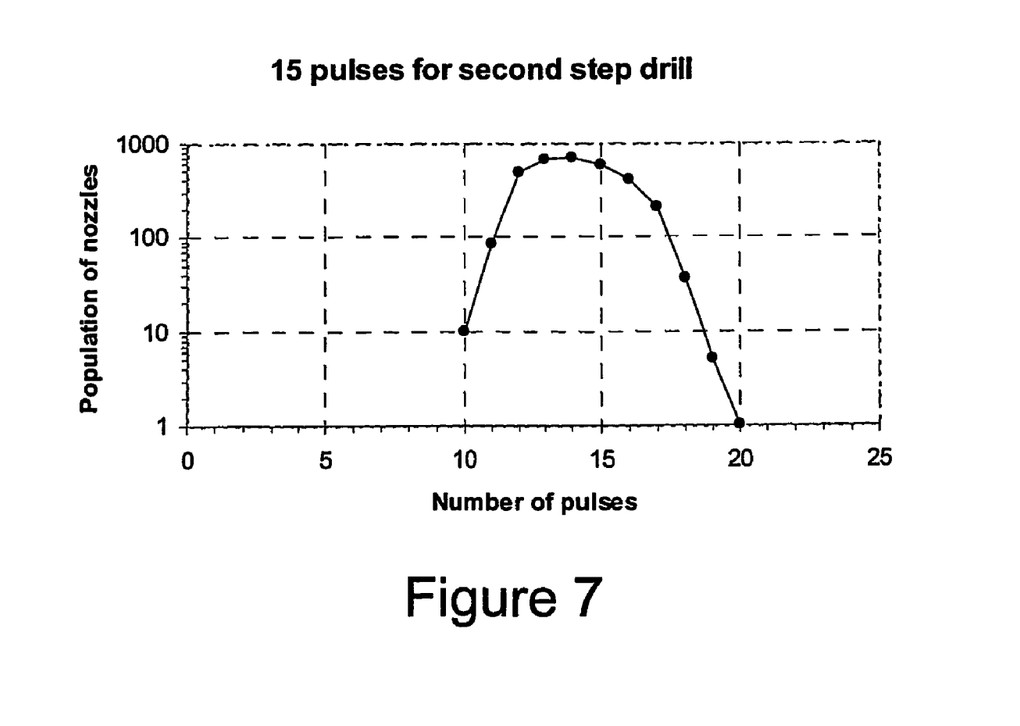
FIG. 7 is a chart illustrating the spread of pulses required to form the throat portion of nozzles in a single membrane, when the target number of pulses is pre-set to 15.

FIGS. 6 and 7 provide a graphical representation of the population distribution of nozzles 10 on two sample membranes 1 for which the numbers of pulses used to drill through the throat portion 12 is indicated on the x-ordinate. Each membrane 1 was drilled using different target numbers of pulses, $N_t$ within the $N_{error}$ algorithm, for drilling the throat portion 12 of the nozzle in the laser-drilling controller. This distribution data is used to indicate the quality of the nozzle-geometry within each membrane. If this distribution is wide, then a wide distribution in geometry is anticipated in the throat portion 12 on that membrane 1. Similarly if this distribution is narrow, then a narrow distribution in this geometry is anticipated. In FIGS. 6 and 7, the target number of pulses was set to 11 and 15 respectively, for the number of pulses to drill the throat portion 12. For the same membranes, the number of pulses set to drill the diverging portions 11 were set to 20 and 16 respectively, thus maintaining the 31 pulse setting to drill through the overall thickness of the membrane in both cases.

It was found that the membrane 1 from which the data for FIG. 6 was taken contained nozzles with roughly 2:1 ratio of length for the diverging and throat portions respectively, in proportion with the number of laser pulses required to drill these portions being 20:11, respectively. It was also found that the membrane from which the data for FIG. 7 was taken contained nozzles with roughly a 1:1 ratio of length for the diverging and throat portions respectively, in proportion with the numbers of laser pulses required to drill these portions being 16:15. The variation between the number of pulses required to drill the nozzles 10 on each membrane 1 results in a variation in the length of the throat portions 12 of these nozzles. In FIG. 6 this variation results in a finite population of nozzles which have been drilled with between two and five pulses. While this is less than half the target number of pulses set to drill the throat portion 12, these nozzles will be almost indistinguishable through optical transmission measurements of minimum cross-sectional area or diameter. However, it is clear that the throat portion 12 of these nozzles is substantially shorter than the target length, and may be as short as 10% of the overall membrane thickness. During post process cleaning of such a membrane, over-etching of the diverging portion 11 of these nozzles may result in a substantial increase in the diameter throat portion 12. In this case the minimum cross-sectional area of the nozzle will be relatively uncontrolled, and may easily expand towards that of the diverging portion. For example nozzles with a drilled throat portion 12 diameter of ø3.0 μm diameter may easily increase this diameter to over ø15.0 μm.

The membrane 1 used to generate the data in FIG. 7 possesses no nozzles which have throat portions drilled in the range two to five pulses. In fact the minimum number of pulses used to drill any throat portion in this membrane was 10 pulses, thereby the minimum throat length is nearly 40% of the membrane thickness. This increase in the throat thickness has resulted in more than a ten-fold decrease in the population of over-etched nozzles on these membranes after electro-polishing.

The invention claimed is:

1. A method of forming a perforate membrane for use in a liquid transport device, by applying laser energy selectively to a first surface of the membrane in the form of a pulsed, focused beam to form a plurality of nozzles each having a throat portion opening of a selected diameter at one end through the opposite surface of the perforate membrane and a smoothly curved outwardly diverging portion extending from the other end of the throat portion to the first surface of the perforate membrane, and further comprising the steps of:

thereafter electro-polishing the first surface of the membrane and the surface of the diverging portion of the nozzles to remove surface imperfections, and controlling the electro-polishing so as to remove material from the surface of the diverging portion of the nozzles to a depth within the membrane less than the length of the throat portion so that the diameter of the throat portion is unchanged by the electro-polishing step.

2. A method according to claim 1, wherein the laser energy is applied selectively to the first surface of the membrane in the form of a pulsed, focused beam.

3. A method according to claim 2, wherein, for forming each nozzle, a focused laser beam is applied to the first surface of the membrane positioned at a distance from the laser focus, to remove material of the membrane in order to form the diverging portion, and thereafter the distance between the laser focus and the first surface is decreased and/or the pulse energy of the laser beam is reduced, in order to form the throat portion extending from the diverging portion to the opposite surface of the membrane.

4. A method according to claim 3, wherein the distance between the laser focus and the first surface of the membrane and/or pulse energy of the laser beam is adjusted during the step of forming the diverging portion.

5. A method according to claim 3, wherein the distance between the laser focus and the first surface of the membrane and/or pulse energy of the laser beam is adjusted during the step of forming the throat portion.

6. A method according to claim 2, wherein the laser energy is applied in two steps to form each nozzle, between which steps the distance between the laser focus and the first surface of the membrane and/or the pulse energy of the laser beam is adjusted.

7. A method according to claim 1, further comprising electro-polishing the opposite surface of the membrane to remove surface imperfections.

8. A method according to claim 1, wherein the position of the laser focus relative the first surface of the membrane and/or the relative laser pulse energy is controlled by comparison of the number of the pulses required respectively to form the diverging portion or throat portion with a predetermined respective number.

9. A perforate membrane for use in a liquid transport device, the perforate membrane comprising:
- a first surface and an opposite surface;
- a plurality of pulsed, focused laser energy formed nozzles, each nozzle having a throat portion of a selected diameter and being open at one end through the opposite surface and having a smoothly curved outwardly diverging portion extending from the other end of the throat portion to the first surface of the perforate membrane; and
- wherein the first surface of the membrane and the surface of the diverging portion of the nozzles having been electro-polished to a depth of less than the length of the throat portion so that the diameter of the throat portion is unchanged by the electro-polishing.

10. A membrane according to claim 9, wherein the outwardly diverging portion of each nozzle is concave.

11. A membrane according to claim 10, wherein the concave portion is part spherical.

12. A membrane according to claim 9, wherein the throat portion is substantially cylindrical.

13. A membrane according to claim 9, wherein the throat portion is divergent towards the one surface of the membrane.

14. A fluid transport device including a perforate membrane according to claim 9.

15. An aerosol generator incorporating a membrane according to claim 9.

16. A pump incorporating a membrane according to claim 9.

17. A filter incorporating a membrane according to claim 9.

18. A membrane according to claim 9 wherein the throat portion has a selected length extending directly through the plate.

* * * * *